United States Patent [19]

Hartweg et al.

[11] Patent Number: 5,580,534
[45] Date of Patent: Dec. 3, 1996

[54] ZEOLITE-SPINEL CATALYST FOR THE REDUCTION OF NITROGEN OXIDES AND THE PROCESS THEREOF

[75] Inventors: Martin Hartweg, Erbach; Martina Heinau, Ulm; Andrea Seibold, Blaustein-Arnegg; Leonhard Walz, Neu-Ulm, all of Germany

[73] Assignee: Daimler-Benz AG, Germany

[21] Appl. No.: 462,983

[22] Filed: Jun. 5, 1995

[30] Foreign Application Priority Data

Jun. 3, 1994 [DE] Germany ............... 44 19 486.2

[51] Int. Cl.$^6$ .................................. C01B 21/00
[52] U.S. Cl. ................... 423/239.2; 423/213.2; 502/64; 502/73; 502/342; 502/346; 502/524
[58] Field of Search ............... 502/63, 64, 73, 502/342, 346, 524; 423/239.2, 213.2

[56] References Cited

U.S. PATENT DOCUMENTS 3,904,553  9/1979  Campbell et al. ............... 252/465
4,274,981  6/1981  Suzuki et al. ............... 252/438

FOREIGN PATENT DOCUMENTS

| 0042471 | 12/1981 | European Pat. Off. . |
| 0196768 | 10/1986 | European Pat. Off. . |
| 0210681 | 2/1987 | European Pat. Off. . |
| 0395471 | 10/1990 | European Pat. Off. . |
| 43 01 470 | 7/1994 | Germany . |
| 87/06157 | 10/1987 | WIPO . |

OTHER PUBLICATIONS

European Search Report dated Sep. 19, 1995.

*Primary Examiner*—Michael Lewis
*Assistant Examiner*—Thomas G. Dunn, Jr.
*Attorney, Agent, or Firm*—Evenson, McKeown, Edwards & Lenahan, P.L.L.C.

[57] ABSTRACT

The invention provides a catalyst, and a process for preparing the same, for the catalytic reduction of $NO_x$ and for the oxidation of hydrocarbons. The catalyst contains a copper oxide-zinc oxide-aluminum oxide spinel and a zeolitic support material.

20 Claims, 2 Drawing Sheets

ZEOLITE-SPINEL CATALYST FOR THE REDUCTION OF NITROGEN OXIDES AND THE PROCESS THEREOF

BACKGROUND AND SUMMARY OF THE INVENTION

The invention relates to a catalyst comprising a spinel containing copper, zinc and aluminum, and a process for its preparation.

German patent document DE 43 01 470 Al (which is not a prior publication) discloses combining a $CuAl_2O_4$ spinel with tin, lead, an element of the main or transition group II of the Periodic Table of the Elements as oxide or salt or in elemental form and subsequent calcination, to yield a spinel. The previously known spinel of this type is used for the decomposition of $N_2O$. The use of this catalyst for catalytic oxidation of $CO_2$ and $NO_x$, in particular at temperatures of above 100° C., is not known.

For reasons of environmental protection, the purification of gases, in particular exhaust gases as they are formed (for example, in internal combustion engines, particularly diesel or lean-mix engines), in addition to lowering CO concentration, etc., to remove nitrogen oxides, i.e. the degradation of $NO_x$, is an urgent problem.

European patent document EP 042 471 B1 discloses a catalyst used for the catalytic oxidation of carbon monoxide to carbon dioxide ($CO_2$), which catalyst contains the metals copper, zinc and aluminum as metal oxides. At least 60% of the Cu present is bound to the aluminum oxide as a copper oxide-aluminum oxide spinel. In the free spaces of the porous spinel, zinc oxide is arranged in a proportion by weight of from 1% to 20%.

However, thus catalyst is known to have a purifying action only in respect of CO, which is based on a catalytic oxidation of the CO. Whether the catalyst is likewise suitable for purifying gases containing $NO_x$ and/or hydrocarbons, as formed, in particular in the above mentioned internal combustion engines and, for example, also in thermal power stations and the like, is not known.

It is an object of the present invention to provide a catalyst of the generic type which has a good purification action, in particular for $NO_x$, together with as good as possible a stability to the constituents of waste gases.

This object is achieved by the catalyst and method according to the invention, which provides a support material of zeolite with which the spinel is mixed or to which it is applied. The use of a $Cu_AZn_CAl_DO_4$ spinel and a zeolitic support material as a catalyst makes the catalyst largely stable to the constituents of the waste gases such as, for example, $H_2O$, $NO_x$, $CO_2$ and/or $SO_2$, with the catalyst having an oxidizing action on hydrocarbons and a catalytically reducing action on the $NO_x$. The reduction of $NO_x$ takes place in oxygen-containing gas and in the presence of reducing agents such as, for example, hydrocarbons just mentioned. Advantageously, hydrocarbons are present in exhaust gases of internal combustion engines in sufficient concentration. In favorable cases, reductions of above 60% can be achieved at temperatures greater than 300° C.

Other objects, advantages and novel features of the present invention will become apparent from the following detailed description of the invention when considered in conjunction with the accompanying drawings.

DETAILED DESCRIPTION OF THE INVENTION

The catalyst and method according to the invention will now be described in greater detail by reference to the following specific examples.

EXAMPLE 1

A pulverulent spinel comprising copper/zinc/aluminum of the composition $Cu_{0.5}Zn_{0.5}Al_2O_4$ is intimately mixed and ground with pulverulent zeolite (here H-mordenite) in a weight ratio of 10:90. Useful results are also obtained at a mixing ratio of 20:80 or even 30:70. Of the above mixture formed from the metal oxide and the support material, 6.5 grams of powder are charged into a vertically arranged quartz reactor (diameter 20 mm, height about 500 mm) in the middle of which there is arranged a gas-permeable frit for exposure of the sample. The bed depth is about 15 mm. Around the quartz reactor there is arranged a furnace which heats a length of about 100 mm of the middle part of the reactor to temperatures of up to 550° C.

Through the catalyst there is passed, at a space velocity of about 10,000 per hour, a gas mixture comprising 1000 ppm of NO, 1000 ppm of propene, 10% of oxygen, and the remainder argon as a carrier gas. Downstream of the reactor, the NO concentration is measured using a gas detector, with any $NO_2$ formed being reduced to NO in a converter prior to detection. Simultaneously, oxidation of hydyrocarbons to $CO_2$ is observed by measurement of the $CO_2$ content by means of the gas detector. The study on this catalyst indicated, as in the case of all the catalysts of the invention, a high stability.

It is favorable that in the temperature range indicated, which corresponds approximately to the temperatures which can occur in the waste gas stream of an exhaust of an internal combustion engine, the degree of reduction is significantly higher than for the pure spinel. In contrast, a pure H-mordenite leads, under comparable conditions, to no significant $NO_x$ reduction. In a novel and inventive manner, this unexpected result is achieved only by the combination according to the invention.

Figure 1:
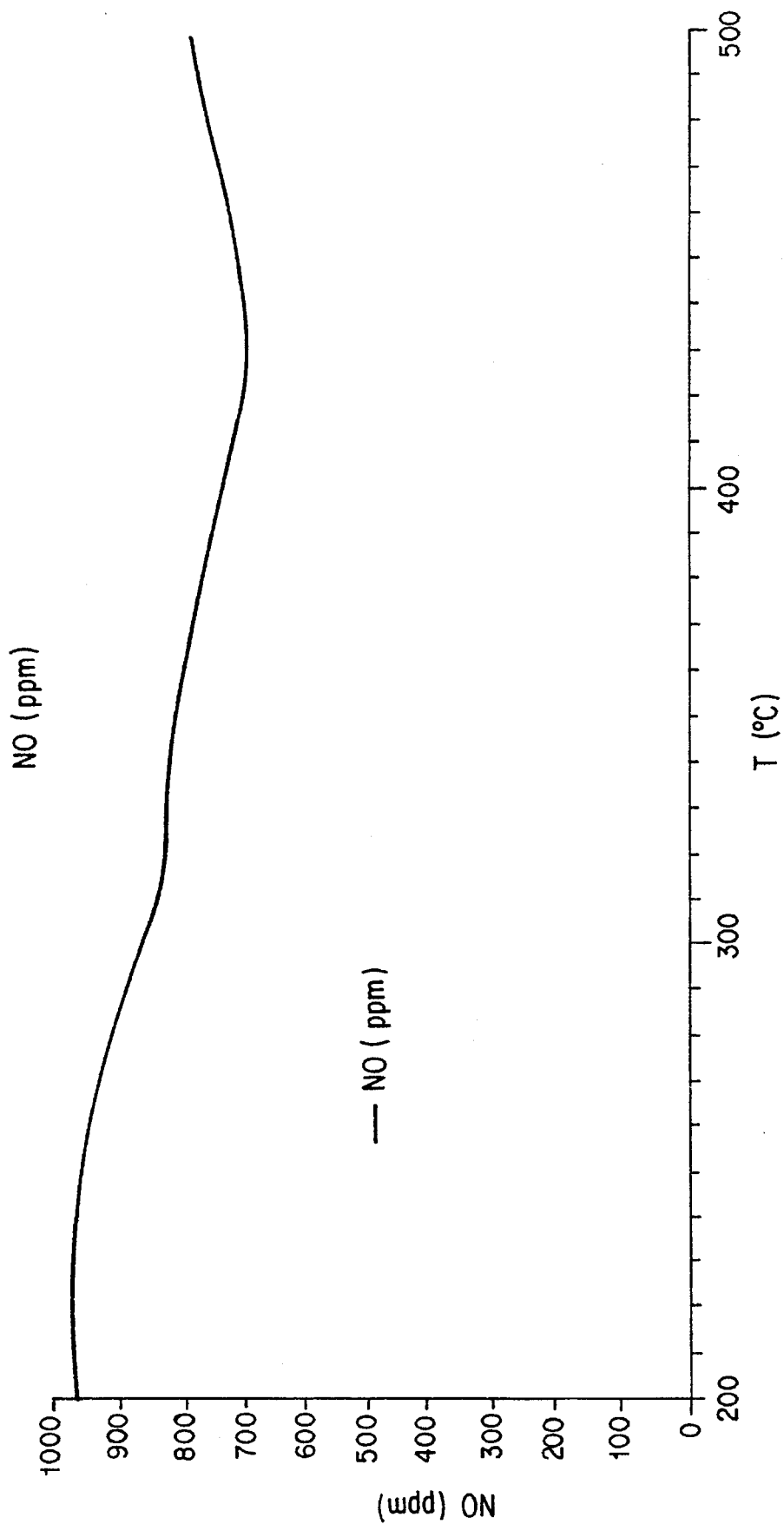
FIG. 1 is a graph of an $NO_x(NO)$ reduction versus temperature for a catalyst containing a $Cu_{0.5}Zn_{0.5}Al_2O_4$ spinel and a zeolitic support material according to the invention.

The proportion of NO in ppm is shown graphically as a function of temperature in FIG. 1, where a significant decrease in the NO concentration with increasing temperature can be seen, the concentration reaching a minimum at about 430° C.

EXAMPLE 2

A pulverulent spinel comprising copper/cobalt/zinc/aluminum of the composition $Cu_{0.25}Co_{0.25}Zn_{0.5}Al_2O_4$ is intimately mixed and ground with pulverulent zeolite (here H-mordenite) in a weight ratio of 10:90. Of the spinel 10 grams of powder are charged into a vertically arranged quartz reactor (diameter 20 mm, height about 500 mm) in the middle of which there is arranged a gas-permeable frit for exposure of the sample. The bed depth is about 15 mm. Around the quartz reactor there is arranged a furnace which heats a length of about 100 mm of the middle part of the reactor, to temperatures of up to 550° C. The substitution of the Co gives the spinel, in particular, a higher resistance to $H_2O$.

Through the catalyst there is passed, at a space velocity of about 10,000 per hour, a gas mixture comprising 1000 ppm of NO, 1000 ppm of propene, 10% of oxygen and the remainder argon as carrier gas. Downstream of the reactor, the NO concentration is measured using a gas detector, with any $NO_2$ formed being reduced to NO in a converter prior to detection. Simultaneously, oxidation of hydrocarbons to $CO_2$ is observed by measurement of the $CO_2$ content by means of the gas detector.

Figure 2:
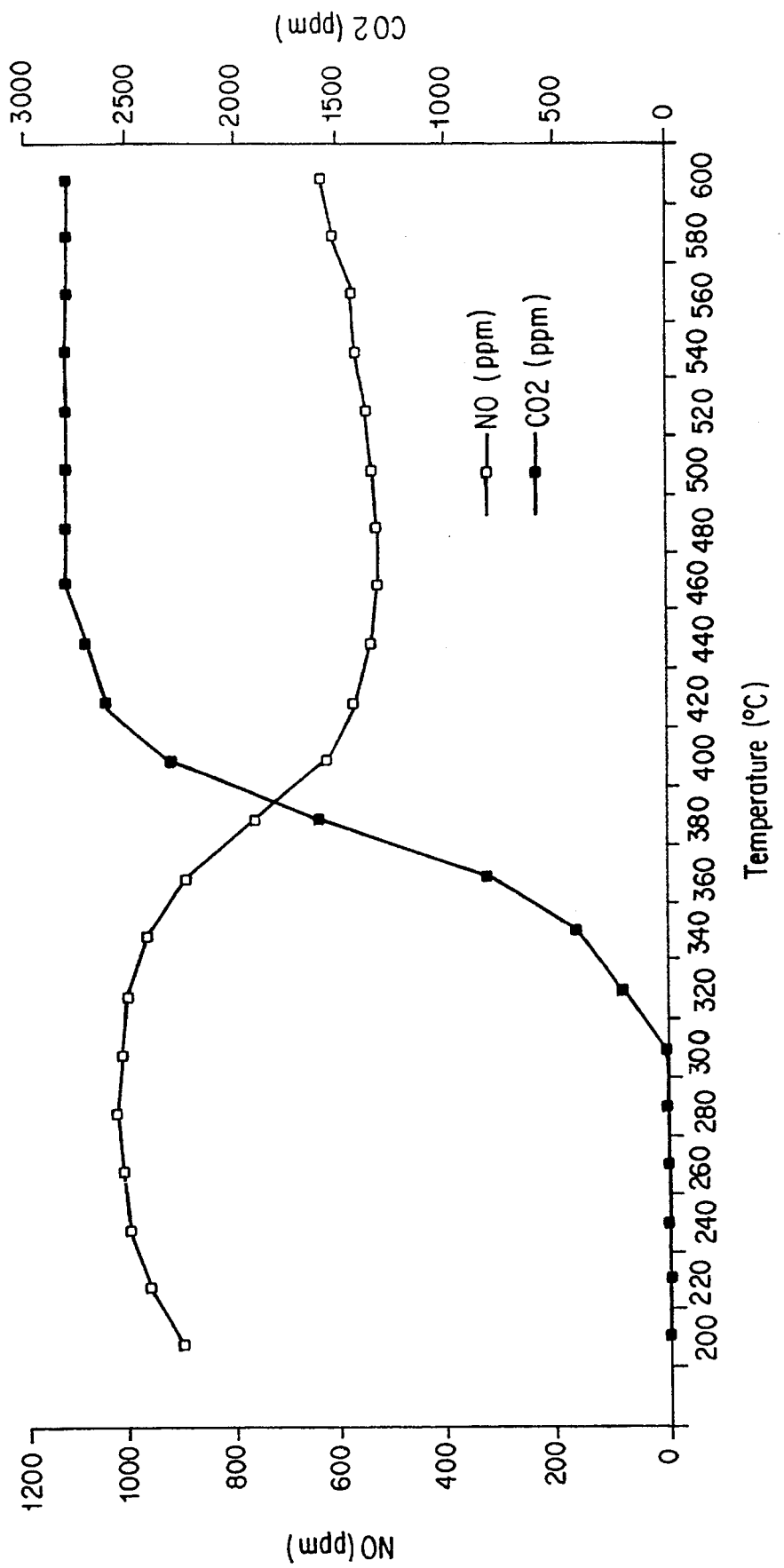
FIG. 2 is a graph of an $NO_x(NO)$ reduction and an oxidation of hydrocarbons versus temperature for a catalyst containing a $Cu_{0.25}Co_{0.25}Zn_{0.5}Al_2O_4$ spinel and a zeolitic support material according to the invention.

The result of the measurement is shown graphically in FIG. 2. The proportions of NO and $CO_2$ in ppm are plotted as a function of temperature, with the $NO_x$ concentration and the $CO_2$ concentration being denoted differently. It can be seen from this graph that there is a distinct decrease in the NO concentration with increasing temperature, the concentration reaching a minimum at about 460° C. and subsequently rising again. For the $Cu_{0.25}Co_{0.25}Zn_{0.5}Al_2O_4$, a drastic decrease in the $NO_x$ concentration is observed from about 200° C., with at the same time the hydrocarbons being converted into $CO_2$, as is shown by the increase in the $CO_2$ concentration. The temperature window in which there is reduction of the $NO_x$ is, depending on the composition of the material, between 200° C. and 500° C.

It is favorable that the specified temperature interval is approximately at the temperatures which can occur in the waste gas stream of an exhaust of an internal combustion engine.

Further studies on this catalyst indicated a high resistance to $NO_x$, $H_2O$, $CO_2$ and $SO_2$.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Catalyst comprising:
   a spinel containing copper, zinc and aluminum; and
   a support material of zeolite;
   wherein the spinel is mixed with or is applied to the support material.

2. Catalyst according to claim 1, wherein the catalyst contains spinel of the formula $$Cu_AZn_CAl_DO_4,$$

where: A+C+D=3 and A>0, C>0, and D>0.

3. Catalyst according to claim 1, wherein said spinel is of the formula $$Cu_{(1-C)}Zn_CAl_2O_4$$

where: 0<C<1.

4. Catalyst according to claim 1, wherein said spinel is of the formula $$Cu_{0.5}Zn_{0.5}Al_2O_4.$$

5. Catalyst according to claim 1, wherein the spinel contains Co and has the formula $$Cu_ACo_BZn_CAl_DO_4,$$

where: A+B+C+D=3, with A>0, B>0, C>0 and D>0.

6. Catalyst according to claim 1, wherein the spinel has the formula $$Cu_{[1-(B+C)]}Co_BZn_CAl_2O_4,$$

where: 0<(B+C)<1, with B>0 and C>0.

7. Catalyst according to claim 1, wherein the catalyst contains a spinel, having the formula $$Cu_{(0.5-B)}Co_BZn_{0.5}Al_2O_4,$$

where: 0<B<0.5.

8. Catalyst according to claim 1, wherein said spinel has the formula $$Cu_{0.25}Co_{0.25}Zn_{0.5}Al_2O_4,$$

where: 0<B<0.5.

9. Catalyst according to claim 1, wherein the spinel is present in particulate form.

10. Catalyst according to claim 1, wherein catalyst has a porous structure.

11. Catalyst according to claim 1, wherein the metal oxides of the spinel make up between 2 and 50% of the weight of the catalyst.

12. Catalyst according to claim 1, wherein the metal oxides of the spinel make up between 10 and 30% of the weight of the catalyst.

13. Process for preparing a catalyst comprising:
   preparing a spinel containing copper, zinc, cobalt and aluminum on a zeolite support material.

14. Process according to claim 13, wherein a mixture is formed from the spinel and the zeolitic support material and said mixture is ground together during mixing.

15. Process according to claim 13, wherein a mixture is formed from the spinel and the zeolitic support material and said mixture is intimately mixed together, with the metal oxides of the spinel being used in a proportion by weight between 2 and 50%.

16. Process according to claim 13, wherein a mixture is formed from the spinel and the zeolitic support material and said mixture is intimately mixed together, with the metal oxides of the spinel being used in a proportion by weight between 12 and 30%.

17. Process according to claim 13, wherein in the spinel the proportions of Cu and Co are approximately equal.

18. Process according to claim 13, wherein in the spinel Co is present in an approximately equal proportion to Cu, with the sum of the Co content and the Cu content being approximately equal to 0.5.

19. A method for the catalytic reduction of nitrogen oxides present in a waste gas comprising passing said waste gas over a catalyst at conditions effective for the catalytic reduction of said nitrogen oxides, said catalyst comprising:
   a spinel containing copper, zinc and aluminum; and
   a support material of zeolite;
   wherein the spinel is mixed with or is applied to the support material.

20. A method according to claim 19 wherein said waste gas comprises exhaust gases of an internal combustion engine.

* * * * *